(12) United States Patent
Barykin et al.

(10) Patent No.: US 9,600,503 B2
(45) Date of Patent: Mar. 21, 2017

(54) SYSTEMS AND METHODS FOR PRUNING DATA BY SAMPLING

(71) Applicant: Facebook, Inc., Menlo Park, CA (US)

(72) Inventors: Oleksandr Barykin, Sunnyvale, CA (US); Josh Metzler, Redwood Shores, CA (US); Lior Abraham, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 461 days.

(21) Appl. No.: 13/951,435

(22) Filed: Jul. 25, 2013

(65) Prior Publication Data

US 2015/0032707 A1    Jan. 29, 2015

(51) Int. Cl.
*G06F 17/30* (2006.01)

(52) U.S. Cl.
CPC .............. *G06F 17/30303* (2013.01)

(58) Field of Classification Search
CPC ......... G06F 17/30082; G06F 17/30085; G06F 17/30628; G06F 17/30303
See application file for complete search history.

(56) References Cited

U.S. PATENT DOCUMENTS

| | | | |
|---|---|---|---|
| 6,738,865 B1* | 5/2004 | Burton et al. | 711/133 |
| 7,647,131 B1* | 1/2010 | Sadowski | G05B 23/0297 700/108 |
| 8,351,495 B2* | 1/2013 | Skeet | 375/232 |
| 8,732,134 B2* | 5/2014 | Geddam et al. | 707/665 |
| 8,874,559 B1* | 10/2014 | Karimzadehgan et al. | 707/723 |
| 9,031,976 B2* | 5/2015 | Seufert et al. | 707/769 |
| 2009/0112945 A1* | 4/2009 | Camble | G06F 17/30162 |
| 2011/0153603 A1* | 6/2011 | Adiba et al. | 707/737 |
| 2012/0054375 A1* | 3/2012 | Arndt | G06F 11/3485 710/18 |
| 2013/0198459 A1* | 8/2013 | Joshi et al. | 711/130 |

* cited by examiner

*Primary Examiner* — Alicia Willoughby
(74) *Attorney, Agent, or Firm* — Sheppard Mullin Richter & Hampton LLP

(57) ABSTRACT

Techniques provided herein allow for management of data. In various embodiments, systems and methods prune and retain data being managed by a data management system, where the managed data can include log data aggregated from one or more servers for analysis purposes. According to some embodiments, pruning can be triggered according to one or more constraints, such as the age of managed data (e.g., retain only 30 days of managed data) or the memory space required to store the managed data (e.g., retain only 100 GB worth of managed data). The constraints that trigger data pruning can be based on a data retention policy. When triggered, pruning can be performed on a fraction of the managed data stored based on the data retention policy (e.g., 3 days of full managed data, 27 days of pruned managed data). The pruning may be performed by sampling, at a desired rate, the managed data.

20 Claims, 11 Drawing Sheets

SYSTEMS AND METHODS FOR PRUNING DATA BY SAMPLING

FIELD OF THE INVENTION

The present application relates to data management and, in particular, reduction of data based on sampling.

BACKGROUND

Social networks have revolutionized electronic communications by providing users with interactive ways to communicate and connect with one another. Users of social networks can, for instance, exchange electronic messages and create relationships with each other or with particular communities in the social network. Some social networks also provide public and private message boards for users to express ideas and share images, video, and interactive content. Due to the popularity of these and other features, a significant portion of humanity maintains membership with some form of social network.

Routine usage of a social network can result in the generation of large volumes of data relating to that usage, including log data regarding user activity on a social network or relating to various systems that provide or support the social network. Data generated by social networks can include data relating to how various segments (e.g., features) of a social network are performing, data relating to how various systems that support the social network are performing, data relating to trends in content generated or accessed by users, behavioral data regarding users, and the like. These and other types of data can be useful in performing analytics on the social network.

Due to its storage footprint and rate of generation, managing and querying data generated by a social network can prove to be a difficult task for operators of the underlying system. For example, quality assurance teams and product development teams may find it difficult to analyze data relating to usage of newly deployed or longstanding social network features. Likewise, as another example, those teams may encounter difficulties in assessing the performance of various system components that support those features.

SUMMARY

Techniques provided herein allow for management of data. In various embodiments, systems and methods prune and retain data being managed by a data management system, where the managed data can include log data aggregated from one or more servers for analysis purposes. According to some embodiments, pruning can be triggered based according to one or more constraints, such as the age of managed data (e.g., retain only 30 days of managed data) or the memory space required to store the managed data (e.g., retain only 100 GB worth of data). The constraints that trigger data pruning can be based on a data retention policy. When triggered, pruning can be performed on a fraction of the managed data stored based on the data retention policy (e.g., 3 days of full managed data, 27 days of pruned managed data). The pruning may be performed by sampling, at a desired rate, the managed data.

In an embodiment, systems and methods can detect when a constraint for storing a data set has been exceeded. Based on that constraint, the systems and methods can identify an initial data subset, in the data set, from which at least some data elements will be removed (or "pruned") by sampling. The systems and methods can then determine a sampling rate for data element retention from the initial data subset. Subsequently, the systems and methods can identify a secondary data subset, in the initial data subset, by sampling the initial data subset according to the sampling rate. Thereafter, the systems and methods can remove, from the data set, one or more data elements identified as part of the initial data subset (i.e., the non-sampled data subset) while retaining data elements identified as part of the secondary data subset (i.e., sampled data subset).

In an embodiment, the data set can comprise log data generated by another computer system, such as a computer system that supports an operation of a social network. For example, the log data may comprise one or more time-stamped data elements regarding user activity occurring on the social networking system, or regarding a component of a computer system that supports the social networking system.

In an embodiment, the constraint can relate to age of data elements in the data set.

In an embodiment, the constraint can relate to storage space occupied by data elements in the data set.

In an embodiment, the constraint can be based on a data retention policy, which may determine how data being managed should be removed or retained.

In an embodiment, the data set comprises data sampled from a larger data set, thereby rendering the sampling operation used for data removal a "sub-sampling" operation. For example, where the data set comprises log data from various components, such log data may be a fraction and/or a representative sampling of the larger data set.

In an embodiment, the initial data subset may be identified according to a data retention policy. Additionally, in an embodiment, the data retention policy may prohibit removal of data elements from the data set that have been maintained for less than a threshold period of time. For example, where a data policy requires that data, in the data set, from the last 3 days should be retained in full while the remainder can be removed by sampling, the initial data subset identified in the data set may only include data older than the past 3 days. If the data in the data set were log data, for example, data age could be determined by way of included timestamps.

In an embodiment, the sampling rate can be defined by a ratio of data elements. Examples of sampling rates can include, without limitation, 1/20, 1/5,000, or 1/10,000 data elements.

In an embodiment, the sampling rate can be determined based on a type of data included in the data set. For example, where the data set comprises event log data, the type of data element can be based on an event type.

In an embodiment, the data set can be a database table. For example, rows from the database table can be the data elements in the data set. Additionally, in some embodiments, the sampling rate can be determined based on a table type associated with the database table.

For some embodiments, the sampling rate can be determined such that a representative portion of the data is retained during the data removal process.

In an embodiment, the systems and methods can further designate data of the second data subset as being data retained during a data removal process. In some embodiments, when a data query is performed on a data set the query result returned can appropriately indicate when at least some data elements, included in the query result, were retained by sampling. According to some embodiments, data retained by sampling can be bypassed during subsequent removal processes that involve sampling.

In an embodiment, the systems and methods can associate the sampling rate with data of the second data subset. In some embodiments, when a data query is performed on a data set subjected to data removal by sampling as described herein, the query result returned can appropriately indicate when at least some data elements, included in the query result, were retained by sampling and by what sampling rate (which can differ from data element to data element). Where the data set is a database table and the data elements of the data set are associated with the rows of the database table, the sampling rate may be associated with data elements by way of a value associated with each row (e.g., sampling rates stored in the column of the database table).

In an embodiment, the data set may be stored in an in-memory database. For example, the computer system may be operating and/or be part of an in-memory database system.

In alternative embodiments, systems and methods can detect when a constraint for storing a data set has been exceeded. Based on that constraint, the systems and methods can identify an initial data, in the data set, from which at least some data elements will be removed by sampling. The systems and methods can then determine a sampling rate for data element removal from the initial data subset. Subsequently, the systems and methods can identify a secondary data subset, in the initial data subset, by sampling the initial data subset according to the sampling rate. Thereafter, the systems and methods can remove, from the data set, one or more data elements identified as part of the secondary data subset (i.e., the sampled data subset) while retaining the remainder of data elements identified as part of the initial data subset (i.e., non-sampled data subset).

Many other features and embodiments of the invention will be apparent from the accompanying drawings and from the following detailed description.

Figure 1:
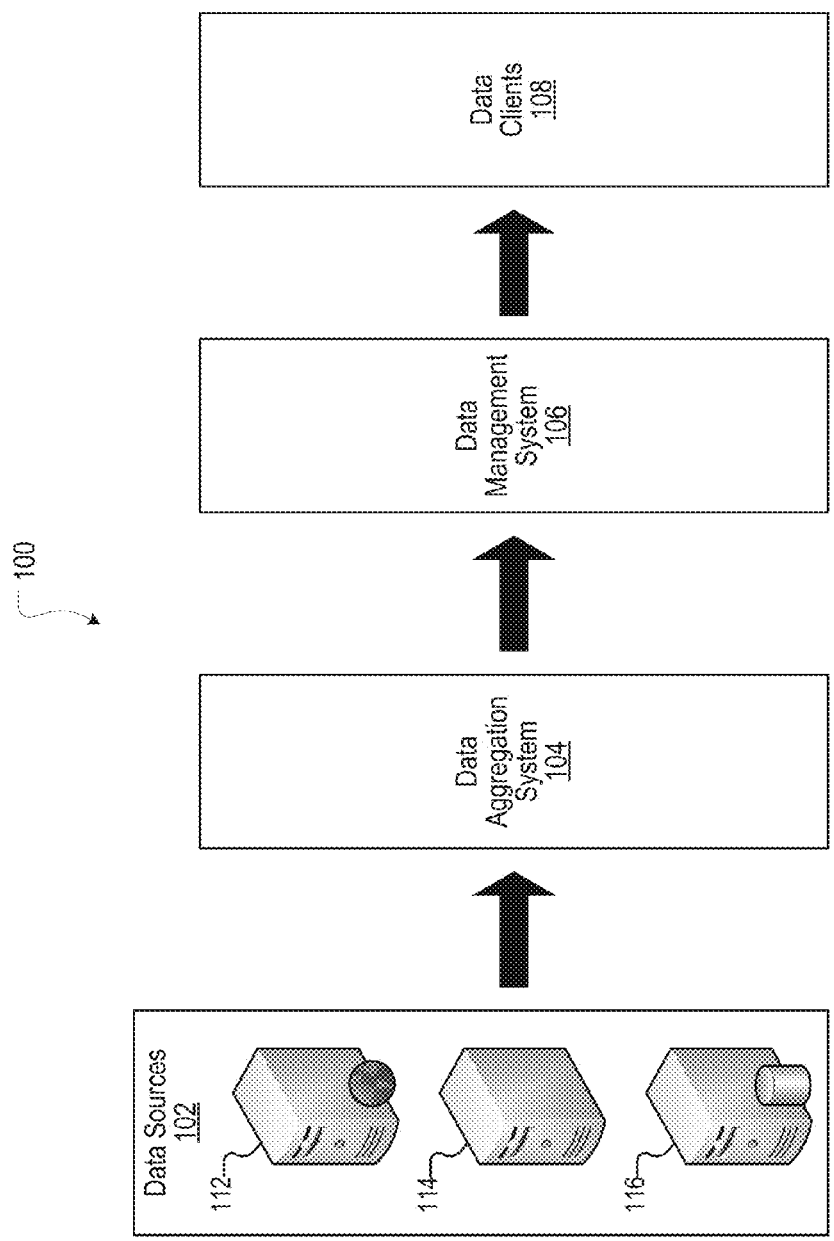
FIG. 1 illustrates an example of a data processing system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

A social networking system may include a complex web of interdependent subsystems. Problems in any of these subsystems may cause issues that can propagate through the social networking system. As an example, problems in a web server may cause problems elsewhere in the social networking system. To help operators identify problems and monitor the state of the social networking system, persistent event processing systems may be employed. The persistent event processing systems may use hard-drives to store event logs of events that occur on the social networking system. Operators seeking to understand the events may query the hard-drives for information, such as performance or user interaction metrics, that are likely linked to the events. Only after evaluating the information on the hard-drives may operators conduct an informed analysis of an event.

However, the process of writing to and querying hard-drives may take hours or even days. Operators may not have access to information about events soon after the events occur. As a result, social networking systems with persistent event processing systems may not have sufficiently low latency to ensure effective operation. Social networking systems with persistent event processing systems also may not provide sufficiently responsive tools for operators. That is, operators may not be able to evaluate the behavior of users of a social networking system or user interactions with the social networking system in a timely manner.

Accordingly, social networking systems may employ in-memory event processing systems capable of receiving, processing, and querying event log data with low latency and sufficient responsiveness, thereby ensuring proper and efficient operation of the social networking systems. Such in-memory event processing systems can import and query data that is critical for real-time (or near real-time) performance and data analysis relating to the social networking systems. The in-memory event processing systems can provide for real-time, interactive, or ad-hoc analysis of event log data, which can be based on queries. The in-memory event processing system can, for example, query hundreds of gigabytes of event log data for events that occurred on the social networking system moments ago. Analysis by in-memory event processing systems can be useful in code regression analysis, bug report monitoring, ads revenue monitoring, performance debugging, or other operational aspects of social networking systems. The systems and methods described herein can be used to optimize management of stored data in such in-memory event processing systems and other data processing systems.

FIG. 1 illustrates an example of a data processing system 100 in accordance with an embodiment of the invention. In FIG. 1, the data processing system 100 is depicted as including multiple data sources 102, a data aggregation system 104, a data management system 106, and data clients 108. In an embodiment of the invention, the data processing system 100 may include additional, fewer, or different components for various applications. In accordance with some embodiments, the data processing system 100 can be configured such that data sources 102 provide data for processing, the data aggregation system 104 aggregates the data, the data management system 106 stores the aggregated data and provides the stored data, or related information, to one or more data clients 108. By such a configuration, the data processing system 100 can enable a social networking system (or other system) to quickly aggregate, store, and query massive amounts of event log data, generated by various components of the social networking system. By doing so, the data processing system 100 can provide operators of the social networking system with real-time or near real-time analytics regarding the operation of the social networking system, which can be useful in code regression analysis, bug report monitoring, ads revenue monitoring, performance debugging, and other operations related areas.

Event log data can, for example, relate to performance events, such as how hardware or software of a social networking system is performing. Performance events can include metrics such as processing load, numbers of cache requests, network throughput, or other metrics. Rapidly providing information about performance events may prove relevant for members of quality assurance teams, such as site performance teams, who are interested in how hardware or software configurations of the social networking system are performing. Performance events can also include error reports related to problems in one or more of the modules that make up the social networking system.

Event log data can include measures of how users interact with the social networking system. Accordingly, for some embodiments, the data processing system 100 may collect and subsequently provide information about user events, such as how users interact with information on the social networking system. Examples of user events can include information about data trends, words in users' posts, surges in word frequencies, demographic information (e.g., users' countries, ages, genders, etc.) of users posting content to the social networking system, etc.

Event log data can include information about behavioral events on the social networking system. Behavioral events may include information relating to how different users of a social networking system respond to changes in a web or mobile platform associated with the social networking system. Examples of behavioral events can include information about usage patterns, such as user locations or ages, product parameters (e.g., devices, operating systems, etc.), or keywords in bug reports. Examples of behavioral events can further include usage of a mobile application associated with the social networking system, interactions of users with advertisements provided by the social networking system, interactions of users with a new page or feature provided by the social networking system, or any other activity that may be influenced by a change to the social networking system.

According to some embodiments, the data sources 102 provide data relating to one or more events on the social networking system. For illustrative purposes, FIG. 1 depicts the data sources 102 as including a web server 112, a backend data server 114, and a database server 116. The data sources 102 may include any type of computer system that provides data, such as event log data. The data sources 102 may also include devices that allow social networking system users to access portions of web servers or backend server systems.

In some embodiments, the data sources 102 may provide log entries that represent events. Each log entry may be based on one or more logging calls implemented and executed by the data sources 102. Each log entry may have a standard format, which can eventually be aggregated by the data aggregation system 104.

In various embodiments, each log entry may include at least one field that provides a unique or semi-unique identifier for the log entry. In some embodiments, a timestamp, such as a UNIX timestamp, may serve as the identifier of each log entry provided by the data sources 102. Use of a timestamp to identify log entries may allow the data sources 102 and the other components of the data processing system 100 to efficiently capture information about time-varying phenomena.

A log entry from the data sources 102 may have a standardized data format to describe events occurring in the social networking system. In some embodiments, the standardized data format may include an integer field, a string field, a string set field that contains unordered strings, and a string vector field that contains ordered sets of strings. The integer field may, for example, include information used for aggregations, comparisons, and groupings. The integer field may also include a timestamp of an event. In various embodiments, a timestamp portion of a log entry, such as a UNIX timestamp, in the integers field may be required for the log entry to be considered by the data processing system 100. Accordingly, the timestamp portion may be taken as, or considered, an index of a given row of log data provided by the data sources 102. It is noted that use of the timestamp field to identify log entries may be useful to identify and analyze time-varying phenomena.

The string field of the standardized data format may include character strings, information for performing comparisons and groupings of text, ordered or unordered sets of strings, information for representing words in a post on a social networking system, etc. As just one example, the string set field may also include information for representing sets of features (e.g., a graph search, a news feed redesign, etc.) that are enabled for a given user of the social networking system. The string vector field of the standardized data format can also include ordered sets of character strings, and information for performing stack traces in the social networking system. In some embodiments, the order of data in the string vector field may correspond to a level of a stack trace in the social networking system.

In various embodiments, the standardized data format may comprise a table, where the first column of the table may include integer fields populated with UNIX timestamps of events being logged in the social networking system. Other columns of the table may include populated integer fields, string fields, string set fields, and string vector fields. For some embodiments, each of the populated fields may be indexed by the UNIX timestamp of the first column of the table. Additionally, for some embodiments, each row of the table may describe an event on a social networking system.

It is noted that the standardized data format may support other types of fields without departing from the scope and substance of the inventive concepts described herein. It is also noted that the standardized data format need not support various data types, such as floating numbers, that may take large amounts of memory to store. In some embodiments, other data types, such as floating number types, may be represented as one of the fields of the standardized data format. For instance, the integer field may be used to represent other data types, such as floating number types.

The data aggregation system 104 may be configured to aggregate log data, or other types of data, received from the data sources 102. According to some embodiments, the data aggregation system 104 may be configured to collect data from the data sources 102, aggregate the data, and deliver the aggregated data to the data management system 106. As described herein, one or more logging calls implemented and executed by the data sources 102 can result in log data being written to the data aggregation system 104. Further, the data aggregation system 104 may be configured to deliver log data to the data management system 106 in batches. Each batch delivered by the data aggregation system 104 may contain rows of log data, where each row may comprise a log entry, where each row may be identified by a timestamp (e.g., UNIX timestamp), and where the rows comprise data relating to different types of events. According to some embodiments, rows in the batch may have different schema and, as such, may include a description of their schema. Upon receiving a batch of data rows, the data management system 106 can use included schema descriptions to appropriately process the rows (e.g., appropriately store the rows to enable future retrieval or querying).

Depending on the embodiment, the log data aggregated by the data aggregation system 104 and delivered to the data management system 106 may be a sample set of log data (i.e., log data subset) derived from a larger set of log data (i.e., log data set). Such a sample set of log data may be derived such that the sample set is representative of the log data contained in the larger set of log data. Additionally, depending on the embodiment, the creation of the sample set of log data may take place at the data sources 102, the data aggregation system 104, or the data management system 106, and may involve one or more of the data sources 102, the data aggregation system 104, and the data management system 106 performing a sampling process. For some embodiments, the sampling of data may be based on or vary according to the type of data. For instance, the rate of sampling used to create a sample set of event log data, from a larger set of event log data, may vary based on the event type associated with such event log data. As described herein, such sampling processes can also be used to retain and remove stored event log data in a data management system, particularly in-memory data management systems.

The data management system 106 may be configured to receive and process log data aggregated by the data aggregation system 104. Processing the data can involve the data management system 106 managing the storage of the aggregated log data and retrieval of the stored log data. Additionally, processing the data can also involve the data management system 106 performing queries on the stored log data and providing stored log data based on such queries. As described herein, the log data may be received by the data management system 106 from the data aggregation system 104 in batches including rows of data (e.g., log data entries). For each batch of incoming data rows, the data management system 106 can select one or more nodes (also referred to herein as "leaf nodes") and send some or all of the data rows to the selected leaf nodes for storage. For some embodiments, the data management system 106 may select one or more leaf nodes based on their respective storage availability (e.g., availability of primary memory space) or may select one or more leaf nodes at random, or a combination of both considerations. As a result, in some embodiments, the data management system 106 may receive a data table in one or more batches and distribute storage of the data table rows by striping the data table rows across two or more leaf nodes. As described herein, where the data table row is a row of log data, a timestamp associated with each log entry can be used as a row identifier, particularly when the data table row is stored at a leaf node. It should be noted that in some embodiments, an identifier for a data table row stored at a leaf node can include a combination of fields in the data table row, where the combination may or may not include a timestamp.

Figure 10:
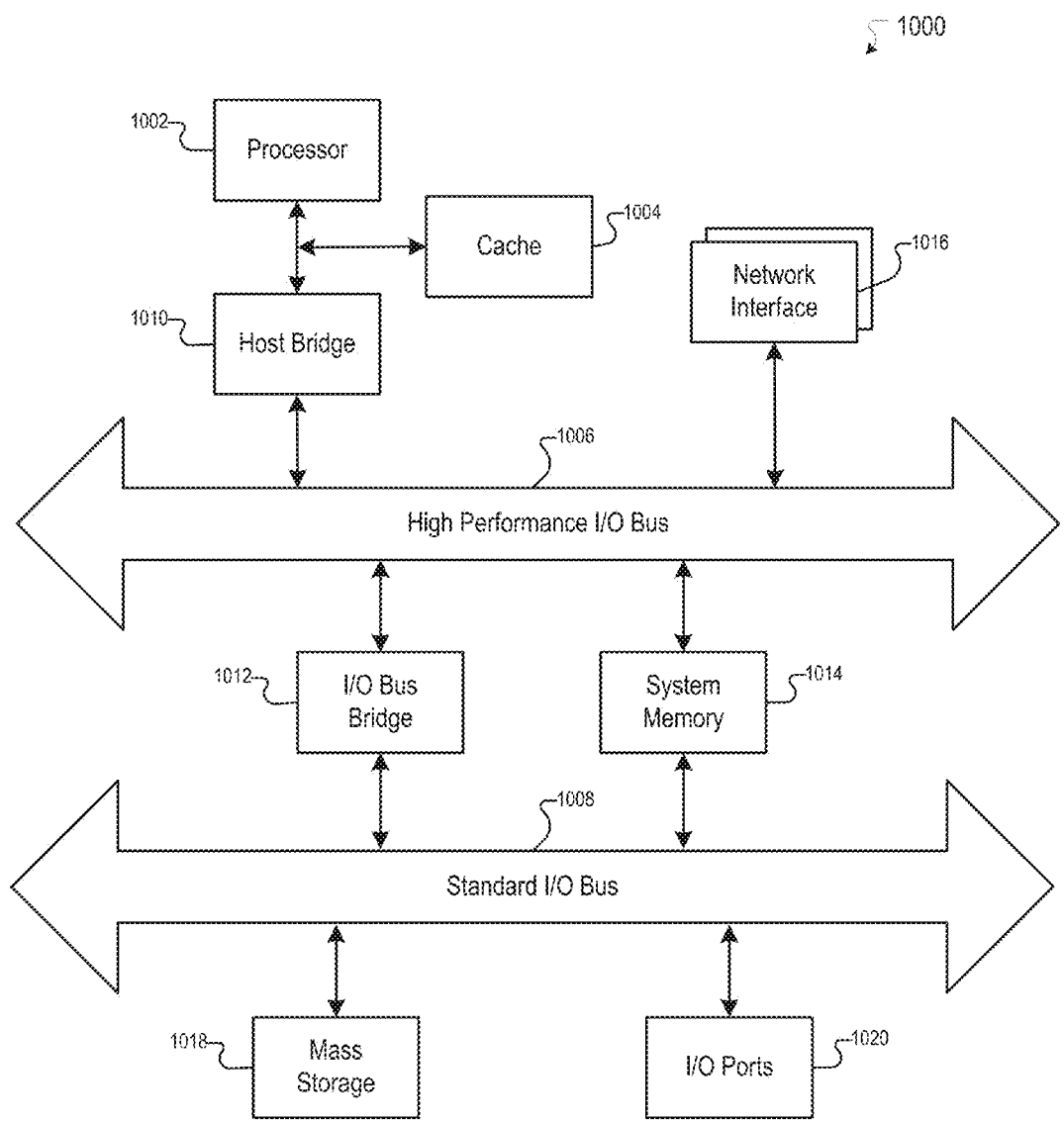
FIG. 10 illustrates a diagram of a computer system in accordance with an embodiment of the invention.

As used herein, a leaf node may be implemented using an independent computer system similar in architecture to the computer system 1000 of FIG. 10. More regarding the computer system 1000 is discussed herein with respect to FIG. 10. Depending on the embodiment, each of the leaf nodes may implement, or be part of, an in-memory database system configured to store data in primary memory (e.g., random access memory) and perform queries on data residing in primary memory, thereby facilitating fast retrieval of stored data based on queries. With a plurality of such leaf nodes, a large number of data tables (e.g., thousands) comprising a large storage footprint (e.g., gigabytes or terabytes) can be quickly scanned when processing a query and returning a query result. More regarding leaf nodes is discussed herein with respect to FIG. 2.

According to various embodiments, the data management system 106 may employ systems and methods described herein for retaining and removing data that is being managed by the data management system 106. For example, where the data management system 106 is storing data received from the data aggregation system 104 at one or more leaf nodes that implement an in-memory database system, the data management system 106 may use systems and methods described herein to manage storage of data being stored by such leaf nodes. The systems and methods described herein may be useful for in-memory database systems, which store data tables in primary memory, particularly when the in-memory database system is continuously receiving new data for storage and removing older data in favor of the new data. For such in-memory database systems, the constant receipt of data for storage can make the primary memory a scarce resource. For some embodiments, a leaf node may need to remove data from its primary memory at a rate that is similar to the rate at which new data is received.

For some embodiments, the data management system 106 may remove and retain data stored at a leaf node based on one or more constraints. Constraints can include, for example, the age of the stored data, the storage space available for new data, or some combination thereof. Other constraints involving other considerations also are possible. The constraints used by the data management system 106 can vary from environment to environment. Depending on the embodiment, the constraints can be defined by or determined according to a data retention policy, which may govern some or all of the operations of the data management system 106. According to some embodiments, a data retention policy can govern the manner in which data stored at a leaf node is removed or retained by the data management system 106 when one or more constraints have been violated or exceeded. As just one example, the data retention policy may provide that data not older than 30 days should be retained at leaf nodes, that the data available at a leaf node should not fall lower than a 40 gigabyte threshold, and that when removing data by sampling, the most recent data from the last 4 days should be retained in full. The last requirement, which relates to removal of data based on sampling and age of the data, may be one where importance is placed on leaf nodes providing users with data query responses reflective of the data most recently received by the leaf nodes. An example environment may be one where the data management system 106 is managing event log data generated by a social networking system and its various components.

The data clients 108 may be configured to access data managed by the data management system 106. In particular embodiments, the data clients 108 may access one or more data interfaces provided by the data management system 106 that provide access to the data managed by the data management system 106. Such a data interface may, in some embodiments, permit a user at a data client to submit, to the data management system 106, one or more data queries (e.g., database queries) in connection with the managed data and receive in response one or more results for the queries. The data management system 106, upon receiving a given data query, may query one or more of the leaf nodes, which store the manage data, based on the given data query. Upon receiving and aggregating the query results provided by the leaf nodes, the data management system 106 may provide to the requesting data client a result based on the aggregated results (e.g., a result comprising a composite of the leaf node results). Depending on the embodiments, when querying the leaf nodes, the data management system 106 may query all available leaf nodes for results, regardless of whether a leaf node is storing data relevant to the current query. Additionally, depending on the embodiment, the query sent to the leaf nodes by the data management system 106 may be based on but not identical to the query received from a data client. For example, the data management system 106 may receive a database query from a data client 108 and convert the received database query to a query compatible with the leaf nodes storing the managed data. For instance, the data management system 106 may receive a query comprising Structured Query Language (SQL) and convert the received to a corresponding query comprising SQL different from the received query. This may be the case where the data management system 106 must account for how data is stored at the leaf nodes.

It should be understood that in various embodiments, the systems and methods described herein can process data that differs from log data in type, format, or content. For instance, certain systems and methods may process data from database tables or data received through a data stream. It should also be understood that in the data processing system 100, the data flow is not restricted to arrows depicted. For some embodiments, the data sources 102, the data aggregation system 104, the data management system 106, and/or the data clients 108 may communicate bi-directionally with one another during operations of the data processing system 100.

Figure 2:
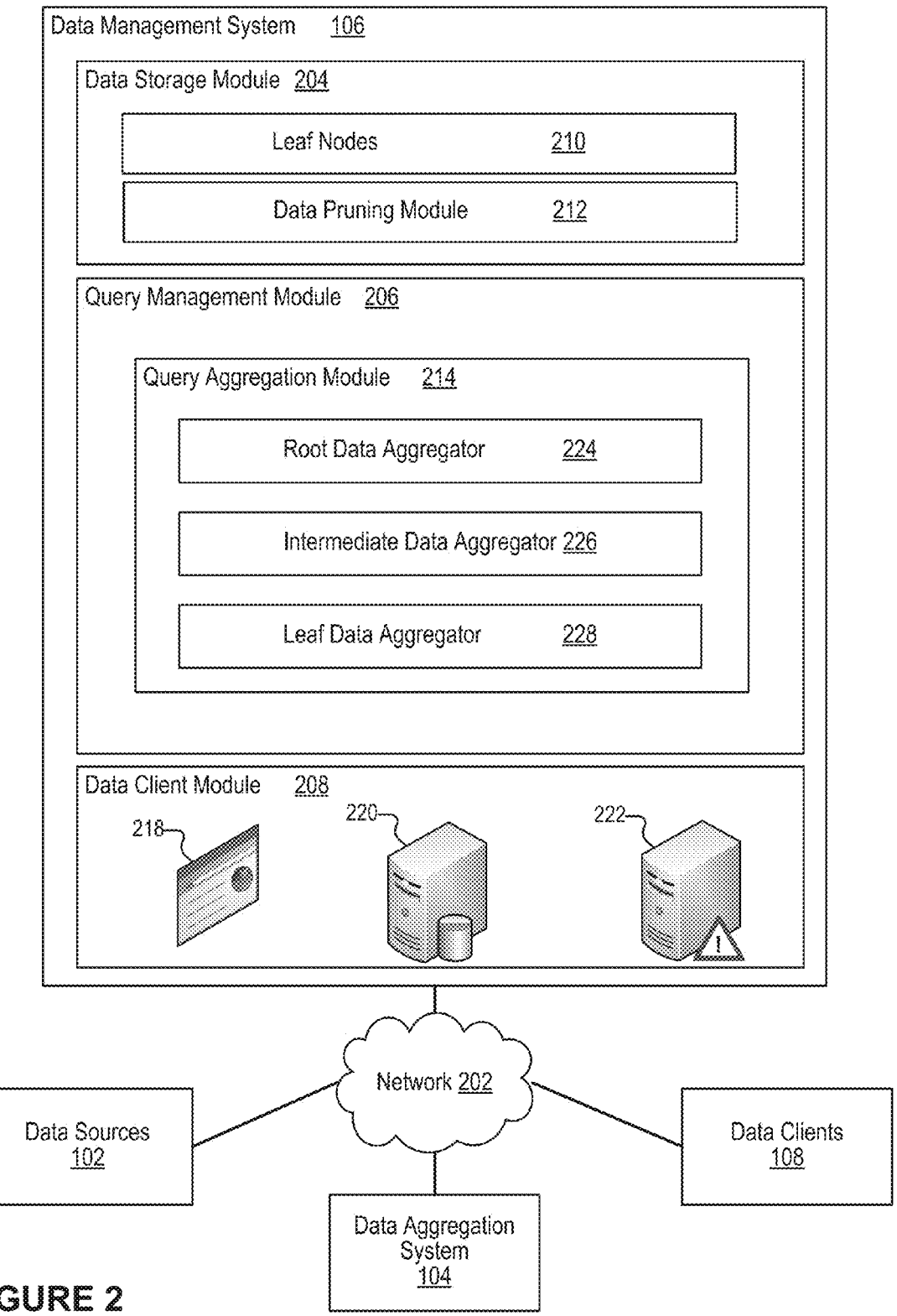
FIG. 2 illustrates an example data management system in accordance with an embodiment of the invention.

FIG. 2 illustrates data management system 106 in accordance with an embodiment of the invention. As described herein, the data management system 106 can be configured to manage data stored on leaf nodes, which can include managing retention and removal of data stored by such leaf nodes. For illustrative purposes, FIG. 2 depicts the embodiment of the data management system 106 as communicatively coupled with the data sources 102, the data aggregation system 104, and the data clients 108 through a network 202, thereby permitting data communication among these entities. For example, through the network 202, one or more data sources 102 can provide log data to the data aggregation system 104, the data aggregation system 104 can provide aggregated log data to the data management system 106, and the data management system 106 can provide one or more data clients 108 with access to data being managed by the data management system 106. FIG. 2 also depicts the embodiments of the data management system 106 as including a data storage module 204, a query management module 206, and a data client module 208. In an embodiment of the invention, the data management system 106 may include additional, fewer, or different components for various applications, as discussed in more detail below. Other components are not shown so as to not obscure relevant details.

The data storage module 204 includes one or more leaf nodes 210, each of which may be configured to store data (e.g., log data) managed by the data management system 106. As described herein, the leaf nodes 210 may implement an in-memory data store system, such as an in-memory database system, which can benefit from various systems and methods described herein for retaining and removing data. According to some embodiments, the leaf nodes 210 are configured into clusters of leaf nodes. Through the data storage module 204, data being managed by the data management system 106 can distribute storage of data to two or more leaf nodes 210. For example, the data storage module 204 can receive a data table for storage and distribute storage of the data table by striping the data table rows across two or more of the leaf nodes 210.

The data storage module 204 may be configured to monitor various aspects of the operation of the leaf nodes 210. Examples of these aspects can include whether leaf nodes 210 are online, whether leaf nodes 210 are available for access, the availability of computing resources at the leaf nodes 210 (e.g., primary memory availability, computing load), and whether leaf nodes 210 are operating in accordance with constraints (e.g., as defined by a data retention policy). Monitoring these and other aspects of the leaf nodes 210 can be useful for selecting one or more leaf nodes 210 for storage of new data, detecting when data removal is required at one or more leaf nodes 210, and submitting data queries to one or more leaf nodes 210. In some embodiments, the data management system 106, and the data storage module 204 in particular, can communicate with the leaf nodes 210 through the network 202.

The data storage module 204 also includes a data pruning module 212, which may be configured to perform data retention and data removal at one of the leaf nodes 210 when storage of data at that leaf node exceeds or violates a constraint of the data management system 106. As described herein, constraints can include, without limitation, the age of the stored data, the storage space available for new data, or some combination thereof. The constraints used by the data pruning module 212 may vary from environment to environment and may be defined by or determined according to a data retention policy. A data retention policy can govern how the data management system 106 performs some or all of its operations. This can include the manner in which data stored at one of the leaf nodes 210 is removed or retained by the data management system 106 when one or more constraints have been violated or exceeded.

An example data retention policy may provide that the age of data retained at one of the leaf nodes 210 cannot be older than a certain threshold (e.g., 30 days), that the amount of data stored at one of the leaf nodes 210 cannot exceed a certain threshold (e.g., 100 gigabytes), and that the data retained at one of the leaf nodes 210 in a recent threshold period of time (e.g., prior two days) should not be removed by sampling. As noted herein, the data storage module 204 may monitor when one of the leaf nodes 210 has exceeded or violated a constraint.

When the data pruning module 212 has detected that a given leaf node has exceeded or violated a constraint, the data pruning module 212 can identify an initial data subset in a data set stored at the leaf node that can be removed such that storage of data meets with the constraint. For example, where a leaf node is storing a data set that exceeds a constraint requiring data older than 60 days be removed, the data pruning module 212 can identify an initial subset of data containing data older than 60 days and remove data from that initial subset.

Identification of the data for removal may be in accordance with a data retention policy that governs the operation of the data management system 106. For example, the data retention policy may require that data no older than 27 days should be retained at leaf nodes, that the data stored at a leaf node should not exceed 120 gigabytes, and that when data is removed by sampling, the most recent data from the last 3 days should be retained in full. For a leaf node having 40 prior days of data that exceeds the 120 gigabyte limit constraint of the example data retention policy, the data pruning module 212 may identify data between 4-40 days old as the initial data subset from which data will be removed from the leaf node.

In accordance with some embodiments, the data pruning module 212 may remove data stored at a leaf node based on a sampling process (or "sub-sampling" process, given that the data in the leaf nodes already represents a sample set of data). Under the sampling process, the data pruning module 212 may remove from the leaf node a fraction of data that meets a certain criteria. For example, the data pruning module 212 may remove a fraction of data rows older than a certain age or fraction of data rows associated with a certain data type, data format, and/or data content. For example, in the context of event log data for a social networking system, the data pruning module 212 may remove a fraction of event log data relating to a new feature of the social networking system, or even log data relating to advertisements. The fraction may be defined by a sampling rate, which may be determined by the data pruning module 212 based on a number of factors. Such factors can include, for example, the data being removed, whether constraints have been exceeded/violated and which ones, and a data retention policy that governs operation of the data management system 106. Where a data set comprises event log data with rows corresponding to log entries, the sampling rate may be the fraction (e.g., 1/24, 1/100, 1/10,000) of rows that will be removed. In some embodiments, the sampling rate may be determined such that the data eventually retained after sampling will be representative of the original data that was pruned.

In some embodiments, the pruning by sampling process may comprise sampling a data set to identify data elements that will be removed, with the balance of the data elements being retained. The sampling rate used during such pruning processes can be referred to as a "sampling rate for data removal." In some embodiments, the pruning by sampling process may comprise sampling a data set to identify data elements that will be retained, with the balance of the data elements being removed. The sampling rate used during such pruning processes can be referred to as a "sampling rate for data retention." In both embodiments, the pruning by sampling results in the removal of data. For example, where an embodiment uses a sampling rate of retention of 1/24 during a data removal process, an alternative embodiment may effectively achieve the same amount of data removal by using a sampling rate of removal of 23/24.

In an embodiment, the sampling rate need not be uniform. For example, the sampling rate may be variable based on time, data type, data volume, and other factors. As another example, the sampling rate may be determined or varied by an operator of the data management system 106. Further, in some embodiments, a sampling rate may be applied to remove some data from lead nodes, while other data in the leaf nodes are retained. In other embodiments, a sampling rate may be applied to retain some data from leaf nodes, while other data in the leaf nodes are removed.

When a data set has been subjected to data removal by sampling, the data pruning module 212 may designate the data that is retained as being such. By doing so, when a query is performed on managed data and data retained after sampling is provided as part of a query result, the query result may indicate or otherwise reflect that some or all of the data included in the query result is based on data retained after sampling. Where the data set comprises rows of data having fields (e.g., event log data), data rows retained after sampling may be designated as such through a value in a field or column of the data row. In some embodiments, the data pruning module 212 may include the sampling rate utilized when the data was retained. For example, where a data row from a data set was retained after a sampling rate of 1/24, a field or column of the data row may indicate the 1/24 sampling rate as the rate of removal. During subsequent data removal processes using sampling, those data rows indicated as being retained after sampling may be further subjected to data removal by sampling or may be omitted from the removal process (e.g., to avoid further dilution of the data).

The query management module 206 may be configured to handle queries received by the data management system 106. In particular embodiments, the query management module 206 may be configured to execute queries on the data managed at the leaf nodes 210 and aggregate results from the leaf nodes 210. When executing a query, the query management module 206 may query some or all of the leaf nodes 210 for results, and may query the leaf nodes 210 irrespective of whether data relevant to the query is stored at the leaf nodes 210. In addition, the query management module 206 may be configured to adapt a query received by the data management system 106 (e.g., from a data client) to a query that is compatible with one or more of the leaf nodes 210. The query management module 206 may be further configured to adapt results returned by the leaf nodes 210 to a format expected by the requesting data client.

To handle querying and receiving results from the leaf nodes 210, the query management module 206 may include a query aggregation module 214 comprising one or more tiers or levels of query aggregators configured to fan-out queries until the queries reach the leaf nodes 210. As shown, the query aggregation module 214 includes a root data aggregator 224, an intermediate data aggregator 226, and a leaf data aggregator 228. It should be understood that the data management system 106 may comprise one or more root data aggregators 224, intermediate data aggregators 226, and leaf data aggregators 228. It should also be understood that the number of levels and aggregators can be more or less than what is described herein.

When the query management module 206 receives a query, that query (or one based thereon) is passed on to the root data aggregator 224. The root data aggregator 224 may parse the query, validate it, and identify two or more intermediate data aggregators 226 to receive the query, thereby creating a fan-out of at least two. In turn, each of the intermediate data aggregators 226 receiving the query may identify two or more leaf data aggregators 228 for receiving the query.

Each of the leaf data aggregators 228 may be configured to submit the query received to one or more leaf nodes 210 belonging to a cluster associated with the leaf data aggregator 228. The leaf nodes 210 may return their respective query results to their respective leaf data aggregators 228, and each leaf data aggregator 228 may collect and aggregate the results from its respective leaf nodes 210. The leaf data aggregator 228 may also collect statistics on whether each of the leaf nodes 210 contained data relevant to the query (e.g., relevant table) and how much data they provided (e.g., how many data rows were provided). The leaf data aggregators 228 may return the aggregated results, and/or the statistics on information collected, to their respective intermediate data aggregators 226, which may consolidate the partial results from the leaf data aggregators 228. In accordance with some embodiments, it is not necessary that each of the leaf nodes 210 is storing managed data relevant to the query received and, as such, some or all of the leaf nodes 210 may not return a query result to their respective leaf data aggregators 228.

Each intermediate data aggregator 226 may propagate its consolidated results to the root data aggregator 224, which in turn may compute the final results. Subsequently, the query management module 206 can provide the final results to the client requesting the query. In some embodiments, this may involve the query management module 206 providing the final results to the data client module 208.

The data client module 208 may be configured to provide the data clients 108 with access to the data being managed by the data management system 106. According to some embodiments, the data client module 208 may be configured to provide the query management module 206 with queries received by the data management system 106. The data client module 208 may also be configured to receive query results from the query management module 206 and enable the query requester to access the query results.

As described herein, the data client module 208 can provide access to the data clients 108 with access through one or more various interfaces. For example, in the embodiment of FIG. 2, the data client module 216 includes a web-based interface 218, an application program interface 220, and an alert-monitor interface 222. The web-based interface 218 may include a web page through which a user may can submit queries on the managed data, and view results to queries, possibly in a selected format (e.g., list, chart, table). The application program interface 220 may permit a program operating at a data client 108 to gain access to data being managed by the data management system 106. For example, through the application program interface 220, a software tool may submit queries on the managed data directly to the data management system 106 and receive results in response. The query received through the web-based interface 218 and/or the application program interface 220 may comprise Structured Query Language (SQL) (or the like). Based on one or more user-defined or system-defined conditions, a user can elect for the data management system 106 to monitor managed data and issue alerts through the alert-monitor interface 222 when certain conditions are met.

Figure 3:
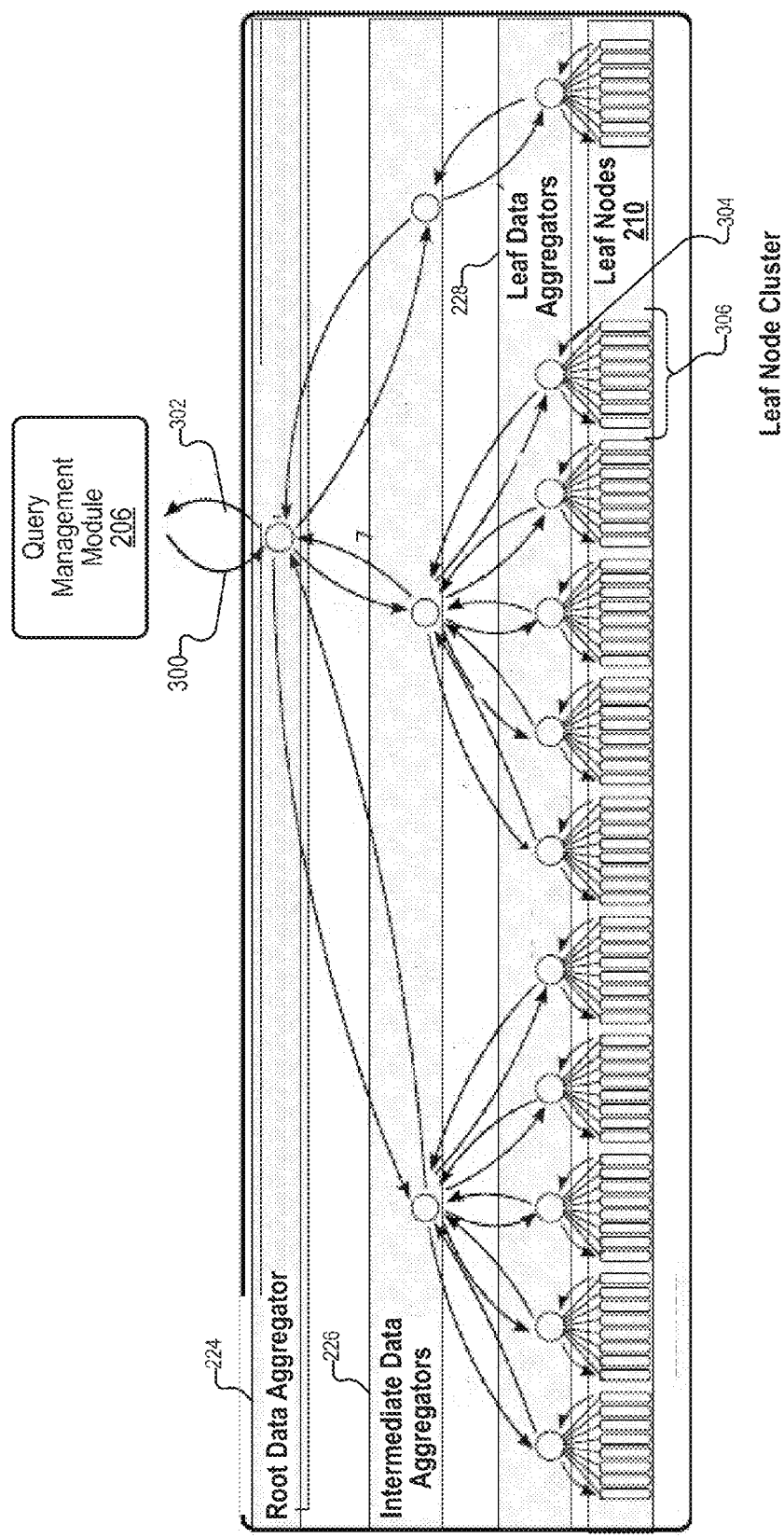
FIG. 3 illustrates an example of a data query in a data storage system in accordance with an embodiment of the invention.

FIG. 3 illustrates an example of a data query 300 in a data storage system in accordance with an embodiment of the invention. As illustrated, the example data query 300 of FIG. 3 involves the query management module 206, the root data aggregator 224, a plurality of the intermediate data aggregators 226, a plurality of the leaf data aggregators 228, and the leaf nodes 210 arranged in leaf node clusters 306. In some embodiments, each leaf node cluster 306 may have a leaf data aggregator 228 that is designated or dedicated to querying one or more of the leaf nodes 210 in that cluster and collecting the corresponding results. As also illustrated, the data query propagates down from the query management module 206, to the root data aggregator 224, to the plurality of the intermediate data aggregators 226, to the plurality of the leaf data aggregators 228, and to the leaf node clusters 306. Results from one or more of the leaf nodes 210 in each of the leaf node clusters 306 are propagated up to their respective leaf data aggregator 228. From the plurality of the leaf data aggregators 228, the results continue to propagate up to the plurality of the intermediate data aggregators 226, and then the root data aggregator 224. The root data aggregator 224 provides the query management module 206 with a final result 302 based on the results provided by the one or more leaf nodes 210.

Figure 4:
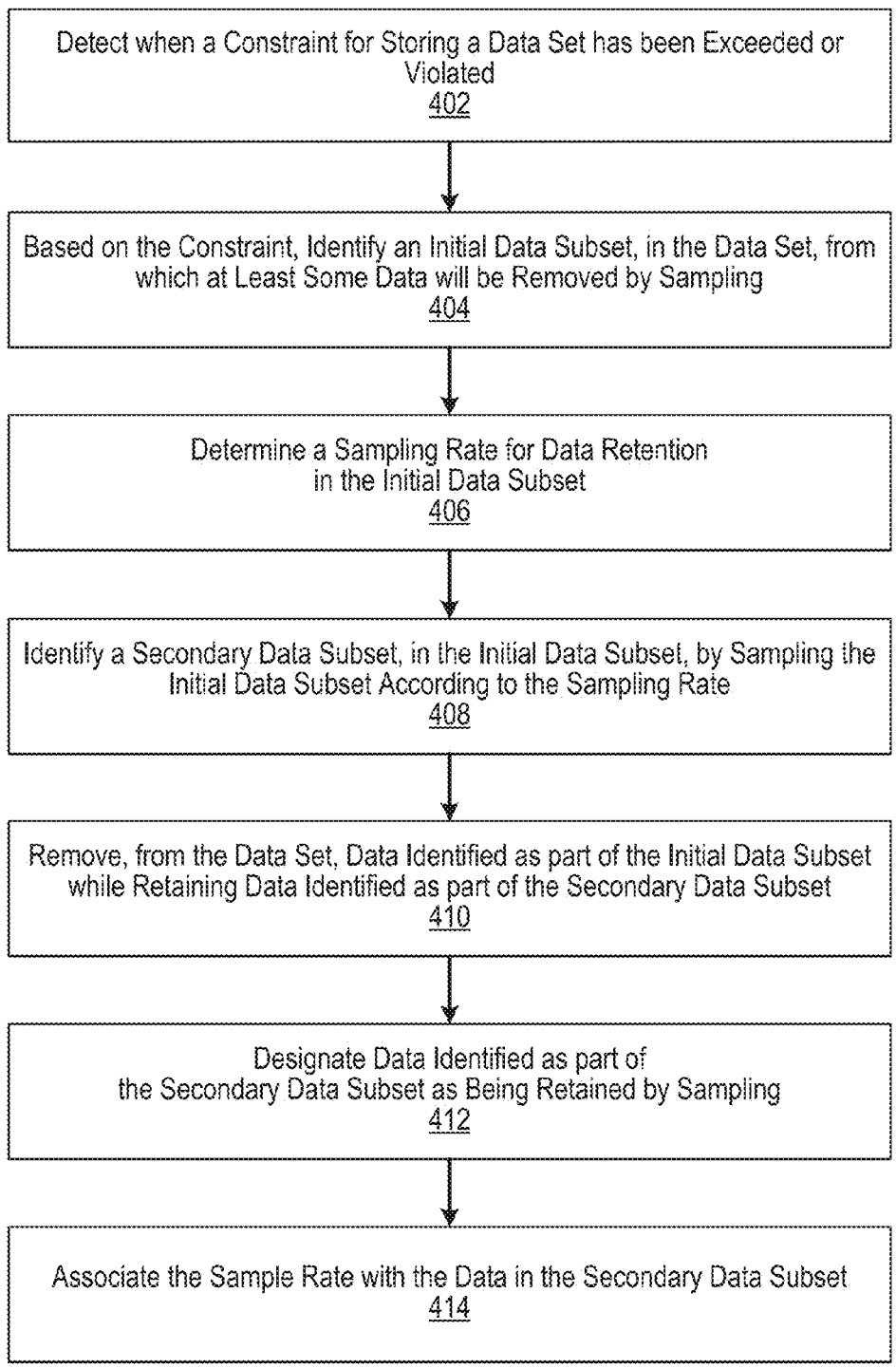
FIG. 4 illustrates an example process for retaining and removing stored data in accordance with an embodiment of the invention.

FIG. 4 illustrates an example process 400 for retaining and removing stored data in accordance with an embodiment of the invention. At block 402, a constraint for storing a data set is detected as being exceeded or violated. As discussed herein, the data management system 106 may detect when a data set stored at one of the leaf nodes 210 has exceeded a constraint relating to data age, data amount, a combination of both data age and data amount, or any other consideration relevant to optimal data processing. In particular, the data storage module 204 may be configured to detect when a constraint for storing the data set has been exceeded or violated. Depending on the embodiment, the data set may comprise some or all of the data stored at the leaf node in question. For example, the data set may comprise all the data currently residing in the primary memory of the leaf node or may comprise data relating to a specific database table.

At block 404, an initial data subset, in the data set, is identified based on the constraint exceeded or violated. The initial data subset is one from which at least some data will be removed by sampling. In accordance with some embodiments, such removal is intended to result in the constraint no longer being exceeded or violated. As described herein, the data pruning module 212 can identify the initial data set and may do so in accordance with the data retention policy governing operation of the data management system 106.

At block 406, a sampling rate can be determined for retaining data in the identified initial data subset. As described herein, the data pruning module 212 may determine the sampling rate based on a number of factors including, for example, the data being removed, the constraints exceeded or violated, and a data retention policy that governs operation of the data management system 106.

At block 408, a secondary data subset is identified, from the initial data subset, by sampling the initial data subset according to the sampling rate determined at block 406. The data pruning module 212 may identify the secondary data subset, from the initial data subset, based on the determined sampling rate (e.g., 1/24, 1/100, 1/10,000 data rows should be retained). In some embodiments, the identification of the secondary data subset may involve the data pruning module 212 marking data identified as part of the second data subset for retention.

At block 410, the data identified as part of the initial data subset, apart from the secondary data subset, is removed from the data set, while data identified as part of the secondary data subset is retained. As described herein, the data pruning module 212 may perform the removal of data in the initial data subset from the data set.

At block 412, data identified as being part of the secondary data subset are designated as being retained by sampling. At block 414, the sampling rate used during the sampling process is associated with the data in the secondary data subset. As described herein, the data pruning module 212 may perform the designation step of block 412 and the association step of block 414.

In some embodiments, the process of 400 may be altered such that the sampling rate determined at block 406 is a sampling rate for removing data from the initial data subset, rather than a sampling rate for retaining data.

Figure 5:
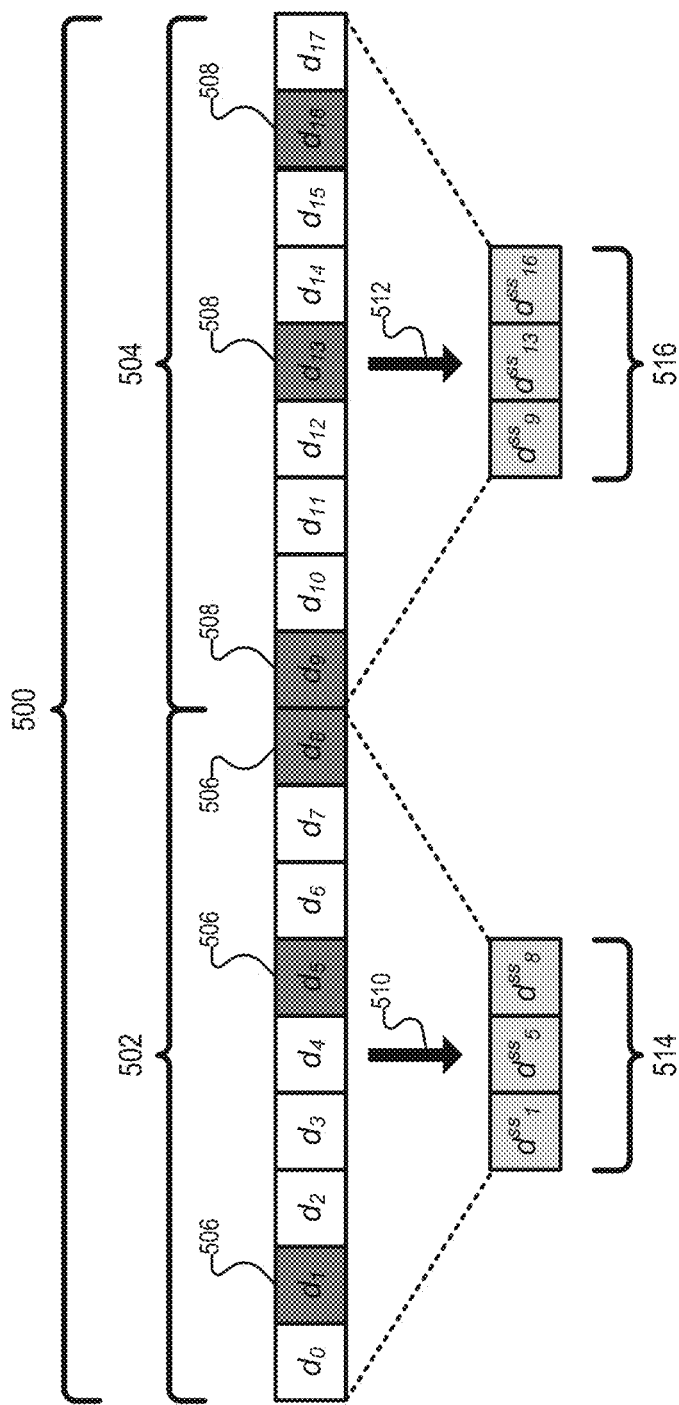
FIG. 5 illustrates an example of sampling in accordance with an embodiment of the invention.

FIG. 5 illustrates an example of sampling in accordance with an embodiment of the invention. In FIG. 5, an example data set 500 includes data elements $d_0$-$d_{17}$. Certain data elements may be selected by a sampling process used to remove and retain data in accordance with some embodiments. As shown, from an initial data subset 502 of the data set 500, a sampling process 510 has identified data elements 506 to create a secondary data subset 514. Likewise, from an initial data subset 504 of the data set 500, a sampling process 512 has identified data elements 508 to create a secondary data subset 516. As just one example, the sampling rate illustrated is 3/9 of data elements.

Figure 6:
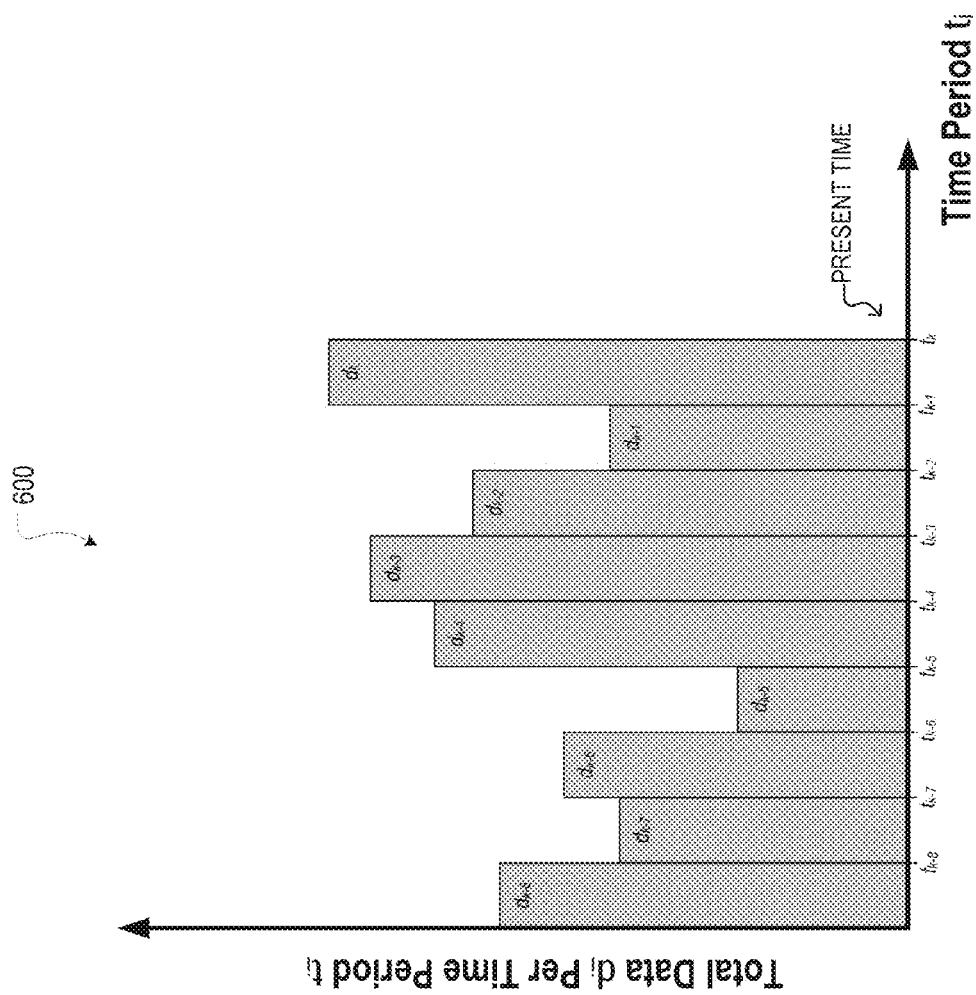
FIG. 6 provides a chart illustrating example stored data before data pruning in accordance with an embodiment of the invention.

FIG. 6 provides a chart 600 illustrating example stored data before data pruning in accordance with an embodiment of the invention. According to some embodiments, the chart 600 represents data stored at a leaf node and under the management of the data management system 106. Each bar $d_i$ represents a data subset associated with a time period $t_i$. Each time period $t_i$ can represent any measure of time including, but not limited to, a second, a minute, a hour, a day, a week, and a year. Each data subset $d_i$ may be associated with a time period $t_i$ where the data subset $d_i$ was generated within that time period $t_i$.

Figure 7A:
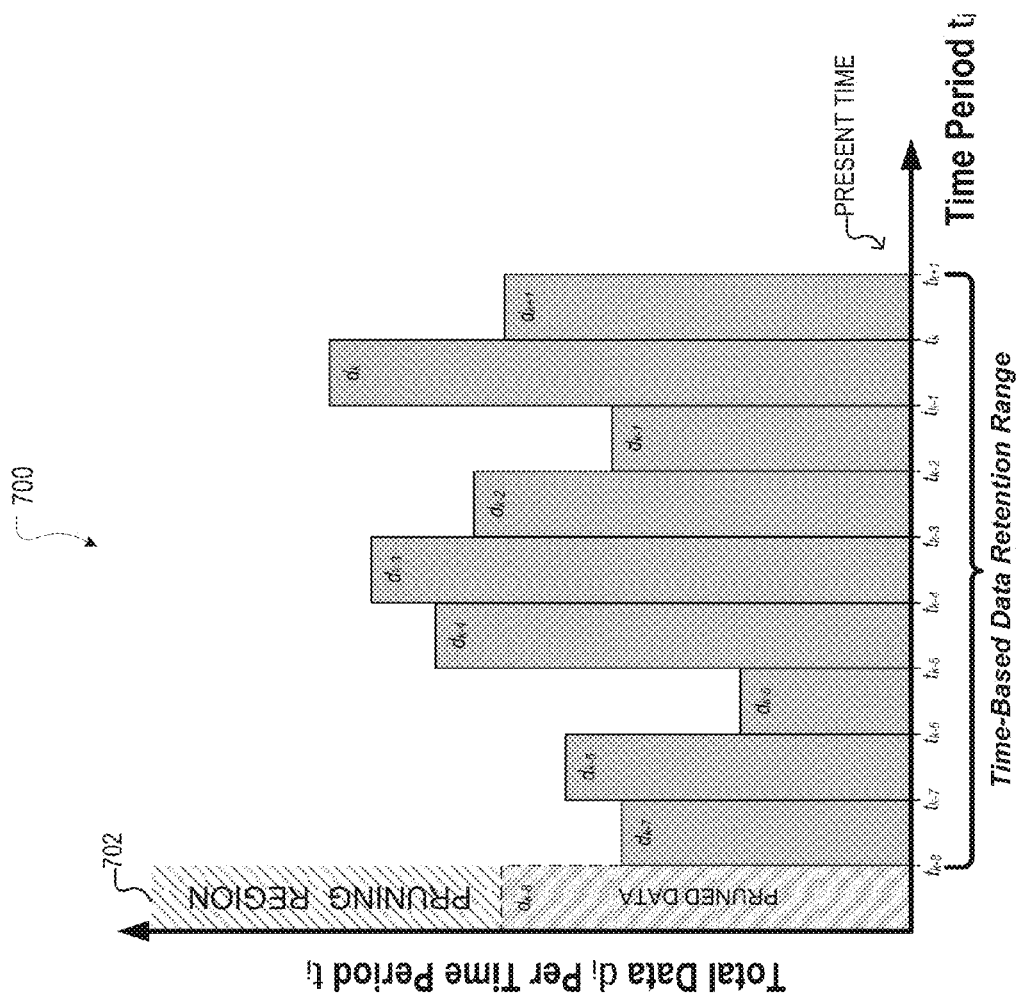
FIGS. 7A and 7B provide charts illustrating example stored data after data pruning in accordance with an embodiment of the invention.

FIG. 7A provides a chart 700 based on chart 600 and illustrates the stored data at the leaf node after data pruning in accordance with an embodiment of the invention. In chart 700, pruning region 702 indicates that data subset $d_{k-8}$ was subject to removal during the data pruning process. In particular, chart 700 illustrates how data subset $d_{k-8}$, which is older than time period $t_{k-7}$, is pruned (i.e., removed) when new data subset $d_{k+1}$ has been added at time period $t_{k+1}$ to the storage of the leaf node. In accordance with some embodiments, the pruning illustrated in chart 700 may be the result of the leaf node exceeding a storage space, age, or other constraint with the addition of new data subset $d_{k+1}$ at time period $t_{k+1}$.

Figure 7B:
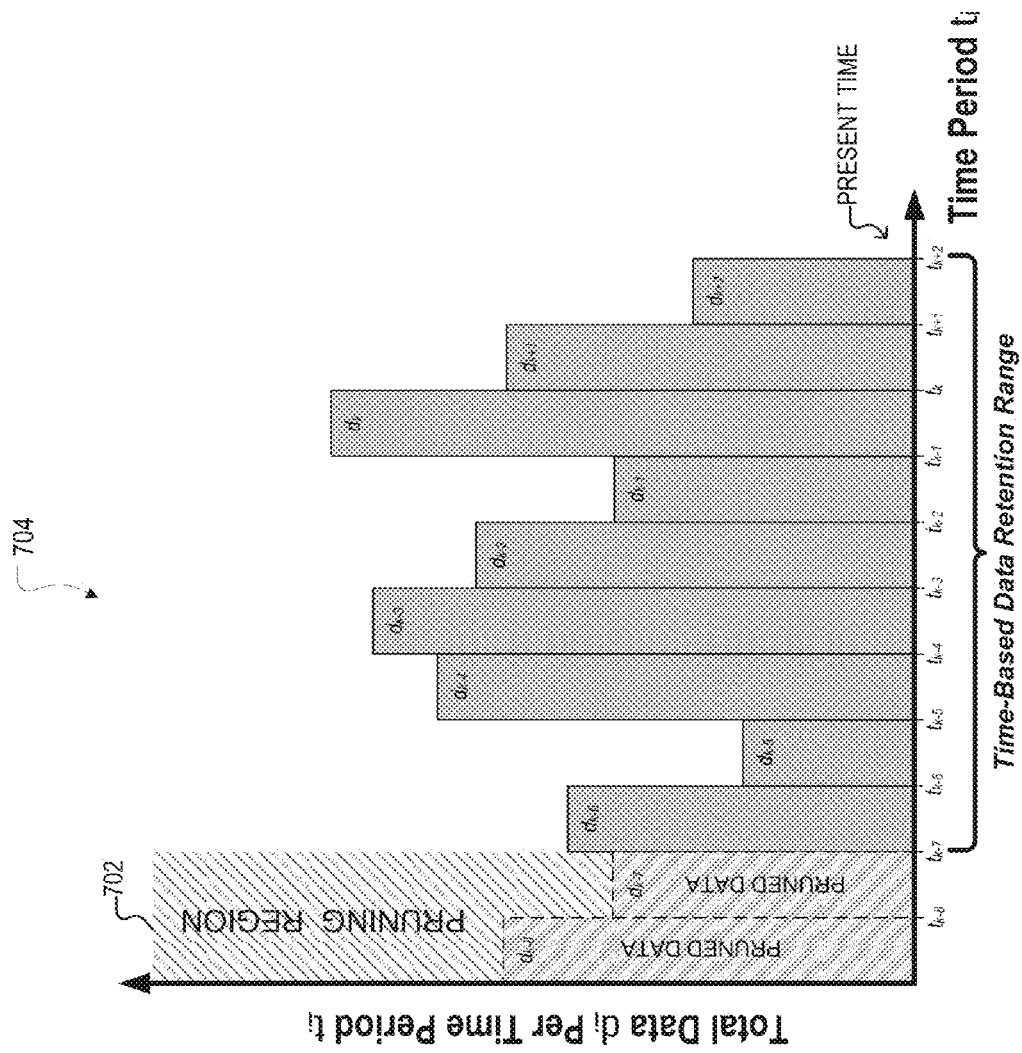

FIG. 7B provides a chart 704 based on chart 700 and illustrates the stored data at the leaf node after additional pruning in accordance with an embodiment of the invention. In chart 704, pruning region 702 indicates that data subsets $d_{k-8}$ and $d_{k-7}$ were subject to removal during the data pruning process. In comparison to chart 700, chart 704 illustrates how the further addition of data subset $d_{k+2}$ at time period $t_{k+2}$ caused the data subset $d_{k-7}$, which is older than time period $t_{k-6}$, to be pruned. In accordance with some embodiments, the additional pruning illustrated in chart 704 may be the result of the leaf node continuing to exceed the storage space, age, or other constraint with the addition of new data subset $d_{k+2}$ at time period $t_{k+2}$.

Chart 700 and 704 illustrate an example age constraint for retaining stored data sets at a leaf node. As shown, the age constraint comprises nine time periods $t_i$ and is illustrated as the "Time-Based Data Retention Range."

Figure 8:
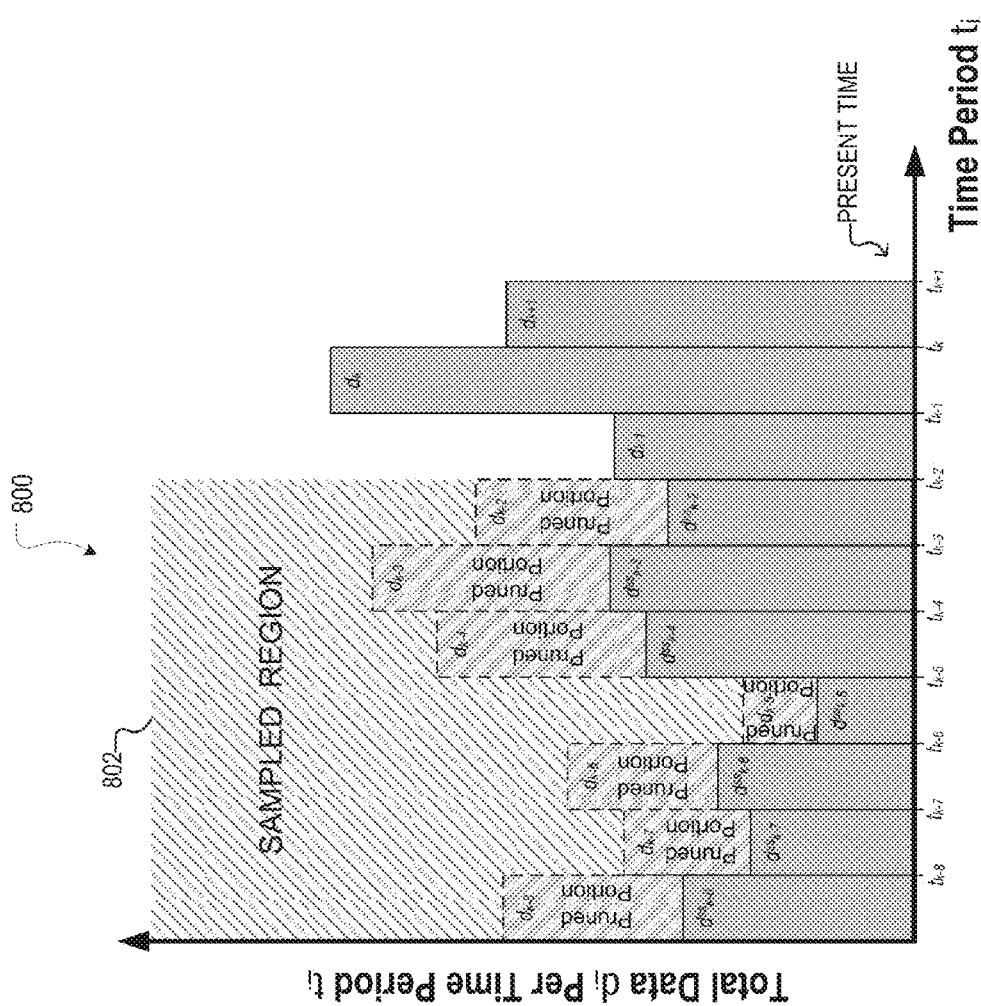
FIG. 8 provides a chart illustrating example stored data after data pruning in accordance with an embodiment of the invention.

FIG. 8 provides a chart 800 illustrating example stored data after data pruning in accordance with an embodiment of the invention. In particular, FIG. 8 provides a chart 800 based on chart 600 and illustrates the stored data at the leaf node after data pruning by sampling in a sampled region 802 based on the addition of new data subset $d_{k+1}$. As shown, the new data subset $d_{k+1}$ results in sample-based data removal from data subsets $d_{k-2}$ through $d_{k-8}$, where data subsets $d_{k-2}$ through $d_{k-8}$ represents data older than time $t_{k-1}$. Each of the data subsets $d_{k-2}$ through $d_{k-8}$ includes a pruned portion and a remaining portion that is retained. While data subsets $d_{k-2}$ through $d_{k-8}$ have been pruned by sampling, data subsets $d_{k+1}$ through $d_{k-1}$ have been retained in their entirety. The sample-based data pruning of data subsets $d_{k-2}$ through $d_{k-8}$ results in data subsets $d^{ss}_{k-2}$ through $d^{ss}_{k-8}$.

Chart 800 illustrates application of an example data retention policy. The example data retention policy may provide that the data subsets of the three most recent time periods should be retained. The example data retention policy also may provide that sampling to remove data should be applied to the remainder of the data subsets. Accordingly, as illustrated, the three most recent time periods $t_{k+1}$, through $t_{k-1}$ should be retained, while the remainder of the data subsets (i.e., data subsets $d_{k-2}$ through $d_{k-8}$) should be subject to data pruning by sampling. In accordance with some embodiments, the sample-based pruning illustrated in chart 800 may be the result of the leaf node exceeding a storage space, age, or other constraint with the addition of new data subset $d_{k+1}$ at time period $t_{k+1}$.

Figure 9:
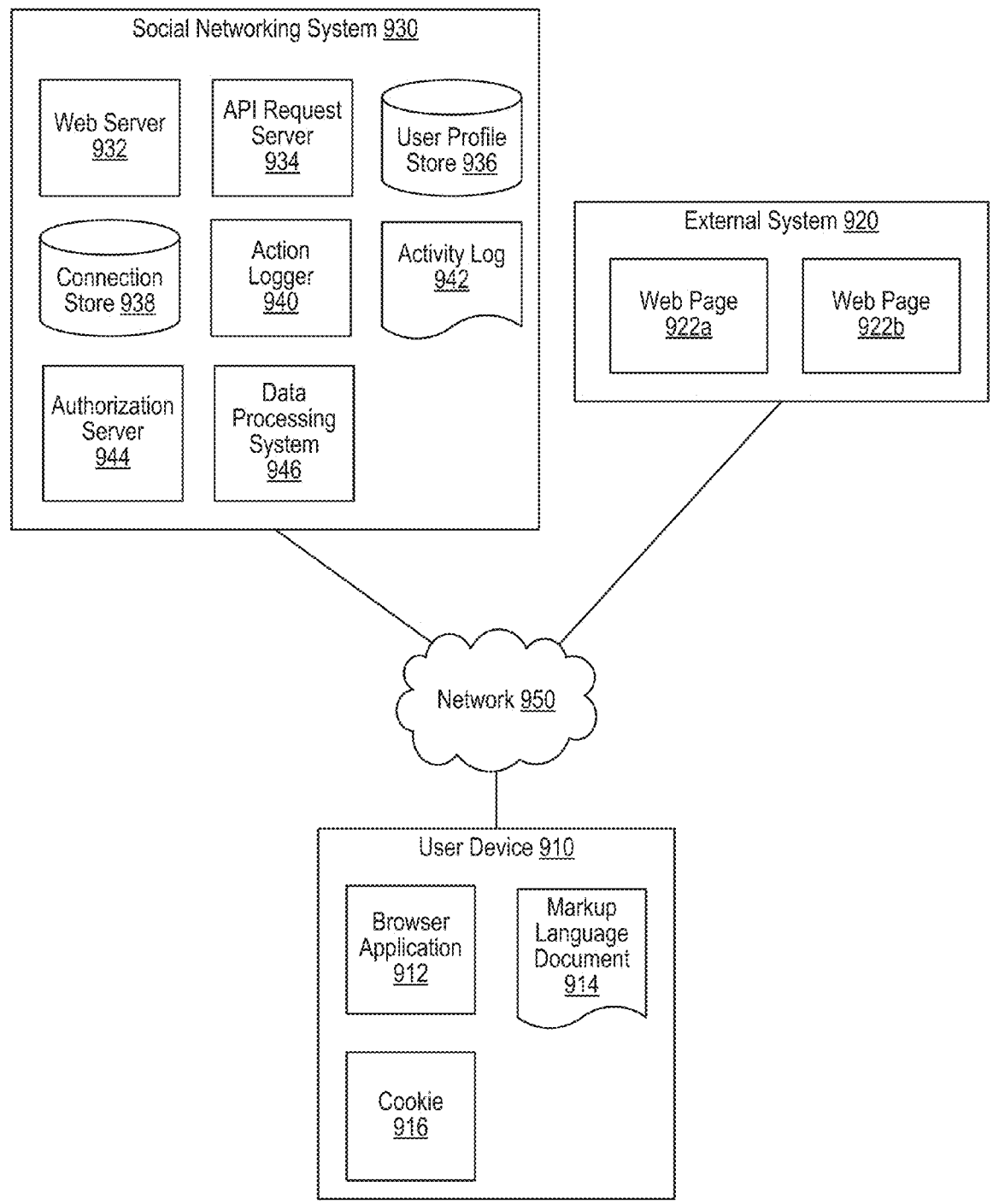
FIG. 9 illustrates an example of a network diagram of system for pruning data by sub-sampling in a social networking system in accordance with an embodiment of the invention.

FIG. 9 is a network diagram of a system 900 for pruning data by sampling in a social networking system 930 in accordance with an embodiment of the invention. The system 900 includes one or more user devices 910, one or more external systems 920, the social networking system 930, and a network 950. For purposes of illustration, the embodiment of the system 900, shown by FIG. 9, includes a single external system 920 and a single user device 910. However, in other embodiments, the system 900 may include more user devices 910 and more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and wide area networks, using wired and/or wireless communication systems.

In one embodiment, the network 950 uses standard communications technologies and protocols. Thus, the network 950 can include links using technologies such as Ethernet, 902.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable customization of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. As described herein, the social network can be represented by a graph, i.e., a data structure including edges and nodes. Other data structures can also be used to represent the social network, including but not limited to databases, objects, classes, meta elements, files, or any other data structure.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. As discussed herein, the social networking system 930 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 930. As noted herein, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third-party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, an authorization server 944, and a data processing system 946. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

As described above in further detail, the data processing system 946 that contains logic that enables a social networking system 930 to aggregate, store, and then query event log data generated by various components of the social networking system 930. In an embodiment, the data processing system 946 may include one or more of the data sources 102, the data aggregation system 104, and the data management system 106, as discussed in more detail herein. As also described herein, event log data can relate to performance events, such as how hardware or software of a social networking system 930 is performing. Event log data can further include measures of how users interact with the social networking system 930, and information about behavioral events on the social networking system 930. Through the data processing system 946, operators of the social network system 930 can access analytics on the social networking system 930 and its various components. Such analytics can, for instance, be useful in code regression analysis, bug report monitoring, ads revenue monitoring, and performance debugging.

The foregoing processes and features can be implemented by a wide variety of machine and computer system architectures and in a wide variety of network and computing environments. FIG. 10 illustrates an example of a computer system 1000 that may be used to implement one or more of the computing devices identified above. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be one of the data sources 102, the data aggregation system 104, the data management system 106, the data clients 108, the social networking system 930, or a component thereof. For example, each leaf node described herein (e.g., leaf nodes 210) can be implemented by an independent computer system similar to the computer system 1000. In an embodiment of the invention, the computer system 1000 may be one server among many that constitutes all or part of the data management system 106.

The computer system 1000 includes a processor 1002, a cache memory 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples the processor 1002 to the high performance I/O bus 1006, whereas I/O bus bridge 1012 couples the two buses 1006 and 1008 to each other. A system memory 1014 and one or more network interfaces 1016 couple to the bus 1006. The computer system 1000 may further include video memory and a display device coupled to the video memory (not shown). Mass storage 1018 and I/O ports 1020 couple to the bus 1008. The computer system 1000 may optionally include a keyboard and pointing device, a display device, or other input/output devices (not shown) coupled to the bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 which, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014, and then accessed and executed by processor 1002. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer system comprising:
at least one processor; and
a memory storing instructions configured to instruct the at least one processor to perform:
    detecting when a constraint for storing a data set has been exceeded;
    identifying, based on the constraint, an initial data subset from the data set for each of a plurality of time periods, from which at least some data elements will be removed by sampling;
    determining a sampling rate for data element retention;
    identifying a secondary data subset from the initial data subset for each of the plurality of time periods, based on sampling the initial data subset according to the sampling rate, the sampling rate applied to the initial data subset for each of the plurality of time periods; and
    removing from the data set one or more data elements of the initial data subset for each of the plurality of time periods while retaining data elements of the secondary data subset for each of the plurality of time periods, wherein the sampling rate is uniform, and wherein the sampling rate is determined such that a representative portion of the data set is retained when the one or more data elements of the initial data subset for each of the plurality of time periods are removed from the data set.

2. The computer system of claim 1, wherein the data set comprises log data.

3. The computer system of claim 2, wherein the log data is associated with operation of a social networking system.

4. The computer system of claim 3, wherein the log data comprises one or more time-stamped data elements regarding user activity occurring on the social networking system.

5. The computer system of claim 1, wherein the constraint relates to age of data elements in the data set.

6. The computer system of claim 1, wherein the constraint relates to storage space occupied by data elements in the data set.

7. The computer system of claim 1, wherein the constraint is based on a data retention policy.

8. The computer system of claim 1, wherein the data set comprises data sampled from a larger data set.

9. The computer system of claim 1, wherein the initial data subset for each of the plurality of time periods is identified according to a data retention policy.

10. The computer system of claim 9, wherein the data retention policy prohibits removal of data elements from the data set that have been maintained for less than a threshold period of time.

11. The computer system of claim 1, wherein the sampling rate is defined by a ratio of data elements.

12. The computer system of claim 1, wherein the sampling rate is determined based on a type of data element included in the data set.

13. The computer system of claim 12, wherein the data set comprises event log data and the type of data element is based on an event type.

14. The computer system of claim 1, wherein the data set is a database table.

15. The computer system of claim 14, wherein the sampling rate is determined based on a table type associated with the database table.

16. The computer system of claim 1, wherein the instructions are further configured to instruct the at least one processor to perform: designating data of the secondary data subset as being data retained during a data removal process.

17. The computer system of claim 1, wherein the instructions are further configured to instruct the at least one processor to perform: associating the sampling rate with data of the secondary data subset.

18. The computer system of claim 1, wherein the data set is being stored in an in-memory database.

19. A non-transitory computer-storage medium storing computer-executable instructions that, when executed, cause a computer system to perform a computer-implemented method comprising:
  detecting when a constraint for storing a data set has been exceeded;
  identifying, based on the constraint, an initial data subset from the data set for each of a plurality of time periods, from which at least some data elements will be removed by sampling;
  determining a sampling rate for data element retention;
  identifying a secondary data subset from the initial data subset for each of the plurality of time periods, based on sampling the initial data subset according to the sampling rate, the sampling rate applied to the initial data subset for each of the plurality of time periods; and
  removing from the data set one or more data elements of the initial data subset for each of the plurality of time periods while retaining data elements of the secondary data subset for each of the plurality of time periods, wherein the sampling rate is uniform, and wherein the sampling rate is determined such that a representative portion of the data set is retained when the one or more data elements of the initial data subset for each of the plurality of time periods are removed from the data set.

20. A computer implemented method comprising:
  detecting, by a computer system, when a constraint for storing a data set has been exceeded;
  identifying, by the computer system, based on the constraint, an initial data subset from the data set for each of a plurality of time periods, from which at least some data elements will be removed by sampling;
  determining, by the computer system, a sampling rate for data element retention;
  identifying, by the computer system, a secondary data subset from the initial data subset for each of the plurality of time periods, based on sampling the initial data subset according to the sampling rate, the sampling rate applied to the initial data subset for each of the plurality of time periods; and
  removing, by the computer system, from the data set one or more data elements of the initial data subset for each of the plurality of time periods while retaining data elements of the secondary data subset for each of the plurality of time periods, wherein the sampling rate is uniform, and wherein the sampling rate is determined such that a representative portion of the data set is retained when the one or more data elements of the initial data subset for each of the plurality of time periods are removed from the data set.

* * * * *